United States Patent [19]

Worthington et al.

[11] 4,144,315
[45] Mar. 13, 1979

[54] PRODUCTION OF HYDROGEN FLUORIDE

[75] Inventors: Ralph E. Worthington, Winter Haven, Fla.; Padraic S. O'Neill, Baton Rouge, La.; Paul F. X. Hackett, Greystones, Ireland

[73] Assignee: Goulding Chemicals Limited, Dublin, Ireland

[21] Appl. No.: 824,508

[22] Filed: Aug. 15, 1977

[30] Foreign Application Priority Data

Aug. 26, 1976 [IE] Ireland ............................... 1909/76

[51] Int. Cl.² .............................................. C01D 3/02
[52] U.S. Cl. .................................... 423/490; 423/483
[58] Field of Search ..................... 423/472, 490, 483

[56] References Cited

U.S. PATENT DOCUMENTS

| 2,426,558 | 8/1947 | Long et al. ...................... 423/472 X |
| 2,588,786 | 3/1952 | Winter ................................. 423/483 |
| 2,816,818 | 12/1957 | Gross .................................. 423/470 |
| 3,005,684 | 10/1961 | Riedl et al. ........................... 423/472 |
| 3,089,752 | 5/1963 | Clark ................................... 423/472 |
| 3,101,254 | 8/1963 | Cunningham ........................ 423/483 |
| 3,195,979 | 7/1965 | Burkert et al. ....................... 423/483 |
| 3,310,369 | 3/1967 | Peterson .............................. 423/472 |
| 3,501,268 | 3/1970 | Laran et al. .......................... 423/483 |
| 3,537,817 | 11/1970 | Bachelard ............................ 423/483 |
| 3,870,786 | 3/1975 | Kidde .................................. 423/483 |
| 4,056,604 | 11/1977 | Thompson et al. .................. 423/483 |
| 4,062,929 | 12/1977 | Thompson et al. .................. 423/483 |

FOREIGN PATENT DOCUMENTS 1010504 6/1957 Fed. Rep. of Germany .......... 423/472
161699 4/1964 U.S.S.R. ................................ 423/472

Primary Examiner—O. R. Vertiz
Assistant Examiner—Thomas W. Roy
Attorney, Agent, or Firm—William R. Liberman

[57] ABSTRACT

Hydrogen Fluoride is manufactured from fluorosilicic acid. The fluorosilicic acid is reacted with ammonia to produce aqueous ammonium fluoride and solid silica. The ammonium fluoride is hydrolised in the presence of a mixture of ammonium fluoride and ammonium bifluoride, and the net production of ammonium bifluoride is converted to sodium bifluoride. The sodium bifluoride is decomposed by heating to hydrogen fluoride gas.

7 Claims, 1 Drawing Figure

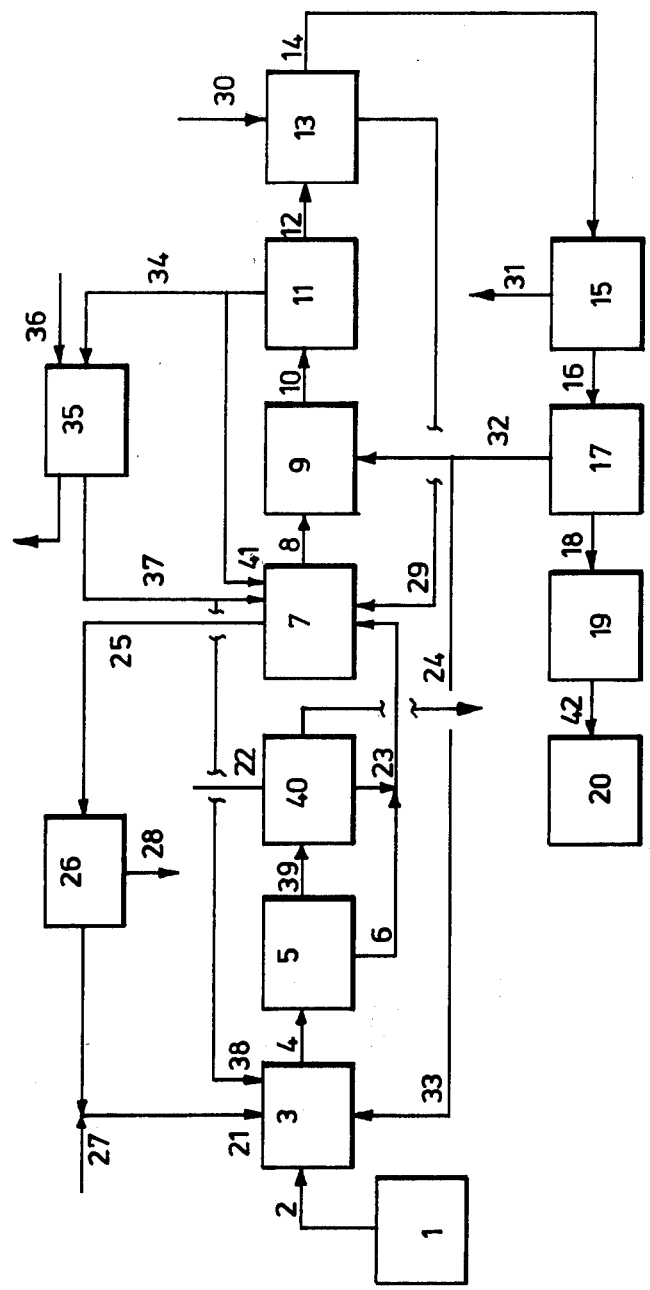

PRODUCTION OF HYDROGEN FLUORIDE

This invention relates to a process for the production of hydrogen fluoride from fluorosilicic acid.

Fluorosilicic acid is a by-product of the manufacture of phosphoric acid and superphosphate fertilisers. Our U.S. patent applications Ser. No. 389,572 (filed Aug. 20, 1973), now U.S. Pat. No. 4,056,604, and Ser. No. 609,299 (filed Sept. 2, 1975), now U.S. Pat. No. 4,062,929, describe a process for the production of hydrogen fluoride from fluorosilicic acid by first reacting ammonia with the fluorosilicic acid and then reacting the ammonium fluoride solution so produced with an excess of an alkali metal fluoride to produce an alkali metal bifluoride. In a preferred embodiment the alkali metal is potassium. In a further preferred embodiment the potassium bifluoride produced is reacted with sodium fluoride in an aqueous slurry in an exchange reactor. The solid sodium bifluoride produced is decomposed into hydrogen fluoride gas and solid sodium fluoride. The sodium fluoride is recycled to the exchange reactor. The exchange of sodium for potassium is desirable as sodium bifluoride is more readily decomposed than potassium bifluoride. However, this approach has disadvantages in the necessity to evaporate large quantities of water and the need for extra capital equipment.

We have now discovered means whereby sodium bifluoride may be produced from ammonium fluoride solution without first producing and separating potassium bifluoride or ammonium bifluoride. We have established conditions under which the reaction $$NH_4F + NaF \rightarrow NaHF_2 + NH_3$$

can be made to proceed at a commercially viable rate in suitable aqueous solutions even in the absence of a highly soluble alkali metal fluoride and which does not require the separation of ammonium bifluoride.

Methods of manufacturing ammonium bifluoride from aqueous ammonium fluoride have been proposed. For subsequent production of alkali metal bifluorides almost all previous workers found it necessary to produce a solid ammonium bifluoride intermediate product. This entails heating to high temperatures, resulting in the formation of a corrosive acidic melt which is invariably a mixture of ammonium bifluoride, ammonium fluoride and water, as described in U.S. Pat. Nos. 3,005,684 and 3,195,979. Under these conditions, gaseous hydrogen fluoride is produced in increasing quantities with increasing temperatures above 150° C. This constitutes a loss in the processes so far described, but has been used to advantage in other processes wherein the ammonium bifluoride is volatilized and the vapours condensed to free the melt of impurities. These other processes have been proposed in U.S. Pat. Nos. 3,310,369 and 3,338,673. Again, severe corrosive conditions are encountered and incomplete conversion is achieved.

U.S. Pat. No. 3,106,449 proposes a continuous process for the production of ammonium bifluoride by crystallization from a concentrated aqueous solution obtained by heating and evaporating an aqueous solution of ammonium fluoride. Pure ammonium bifluoride is obtained after cooling the hot liquor, separating the precipitated crystals and washing and drying them.

The reaction of these solid ammonium bifluoride products with sodium fluoride under aqueous conditions to product solid sodium bifluoride at ambient temperatures is a feature of a number of the aforementioned patents, and a particular feature of U.S. Pat. No. 3,101,254. According to the method of this latter patent, full conversion of the sodium fluoride used is achieved after crystallization and evaporation of the solent, followed by further crystallization and recycling of unreacted ammonium bifluoride after vaporization of the mother liquor.

A method has been proposed in U.S. Pat. No. 3,338,673 for spraying hot molten ammonium bifluoride on to a revolving bed of sodium fluoride particles to produce solid sodium bifluoride and ammoniacal vapours. Much of the fluoride, however, is in the vapour phase at the temperatures employed and the solid product is impure.

The direct reaction of aqueous ammonium fluoride with solid sodium fluoride to produce sodium bifluoride has been examined in U.S. Pat. No. 3,195,979. The authors of this Patent dismiss the reaction, which is also referred to in some earlier patents e.g. U.S. Pat. No. 2,728,634, on account of the low yield of product.

We have studied the production of sodium bifluoride by reacting sodium fluoride with aqueous mixtures of ammonium bifluoride and ammonium fluoride and have established conditions under which a cake of high purity may be obtained. Based on the knowledge available in the prior art, it would be impossible to produce these solutions directly from an aqueous ammonium fluoride feed in a continuously operating process. This is because the solutions are not of sufficient concentration for the reaction (1):

$$2NH_4F \rightarrow NH_4HF_2 + NH_3 \tag{1}$$

to proceed at an economic rate, even in boiling solutions. We have discovered, however, that by operating this system under a small positive pressure such that the boiling temperature may be raised by up to 30° C. an adequate increase in rate may be achieved. Sodium bifluoride may then be produced economically from aqueous ammonium fluoride solution, without the necessity to isolate solid ammonium bifluoride as an intermediate.

It is also possible, of course, to prepare ammonium bifluoride-containing liquors by one of the methods described in the earlier publications or herein and by suitable dilutions to obtain a liquor of appropriate composition for the production of pure sodium bifluoride after contact with sodium fluoride. The penalty for this approach is the cost of evaporation of the dilution water.

Aqueous mixtures of ammonium bifluoride and ammonium fluoride are extremely corrosive to many of the more common stainless steels. We have discovered that small saturation quantities of sodium fluoride and sodium bifluoride in these liquors give rise to a dramatic reduction in corrositivity of the liquors. It is possible, therefore, by the method of our invention to operate this process in readily available mild steel equipment.

The invention therefore provides a process for preparing sodium bifluoride, which comprises feeding aqueous ammonium fluoride to a continuously operated reactor containing a mixture of ammonium fluoride and ammonium bifluoride in aqueous solution boiling at atmospheric or super-atmospheric pressure; withdrawing reaction liquor from said reactor; cooling the withdrawn reaction liquor; contacting the cooled reaction liquor with sodium fluoride to produce sodium bifluoride; and recovering said sodium bifluoride.

The invention also provides a process for the manufacture of hydrogen fluoride from fluorosilicic acid, which comprises reacting the fluorosilicic acid with ammonia to produce aqueous ammonium fluoride and solid silica; continuously hydrolysing the ammonium fluoride in the presence of a mixture of ammonium fluoride and ammonium bifluoride in aqueous solution boiling at atmospheric or super-atmospheric pressure; converting the net production of ammonium bifluoride to sodium bifluoride by contacting the liquor after cooling with solid sodium fluoride; and decomposing the sodium bifluoride by heating to hydrogen fluoride gas and solid sodium fluoride.

Our process therefore has two aspects. First in a boiling pressurised reactor ammonium bifluoride is synthesized in solution as in reaction (1). Second, in a cooled reactor the liquor from the first reactor is contacted with sodium fluoride to produce solid sodium bifluoride as in reaction (2):

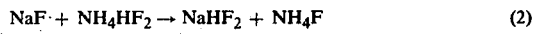

$$NaF + NH_4HF_2 \rightarrow NaHF_2 + NH_4F \qquad (2)$$

The entire net production of aqueous ammonium bifluoride is converted to crystalline sodium bifluoride and the aqueous by-product is recycled to the first reactor for further conversion to bifluoride and to maintain constant conditions therein. The rate of the first reaction is very sensitive to salt concentrations and the vapour pressure maintained over the boiling solution. The production of sodium bifluoride from the cooled liquor is very rapid and the rate is limited for practical purposes by the necessity for adequate physical contact in the slurrying operation.

We have also discovered an effective method of handling the impurities usually encountered in the fluorosilicic acid raw material used for the production of the aqueous ammonium fluoride solution. The acid is normally produced as a by-product of phosphoric acid manufacture and normally contains about 0.5% of $P_2O_5$, traces of sulphate and small quantities of cations such as iron, aluminium and calcium. The cations form very insoluble hydroxides or fluorides which are precipitated with the solid silica in the ammonium fluoride production stage. The maximum phosphate solubility in the ammonium fluoride liquor as normally produced at 40° C. and pH 9 to 9.5 is approximately 0.9% of $P_2O_5$. The silica cake produced by ammoniation of fluorosilicic acid containing more than this concentration of phosphate will be contaminated with some triammonium phosphate trihydrate $(NH_4)_3PO_4 \cdot 3H_2O$. Phosphate remaining in the ammonium fluoride liquor may be effectively dealt with by allowing its concentration to build up within the reactor recycle loop to a level of approximately 3%. By treating a small bleed stream of this recycle liquor with a slight excess of aqueous ammonia, it is possible to eliminate the phosphate as triammonium phosphate. The insolubility of triammonium phosphate in alkaline solution is well-known and has been used as a method of completely removing phosphate from ammonium fluoride in U.S. Pat. No. 2,816,818. In this embodiment of our invention, the relative insolubility of triammonium phosphate trihydrate salt in aqueous solution in the presence of a small excess of free ammonia is used as a means of reducing the phosphate level in a recycle stream. The reduction in phosphate level is equivalent to the amount of phosphate introduced in the feed ammonium fluoride stream. This embodiment also serves as a purge of any heavy metal cations brought into the system. The precise concentrations and stream sizes used are interrelated variables and in a commercial continuously-operating plant would be determined by economic criteria.

Sulphate impurity may be eliminated in a similar fashion. By allowing the sulphate concentration in the recycled liquors to reach a certain low level of about 2%, a portion of the bleed stream used in the phosphate removal step may be treated with lime, thereby precipitating the sulphate as calcium sulphate, mixed with calcium fluoride. The mother liquor containing ammonia and any remaining dissolved salts may be re-used in the process and the solid precipitate separated. The amount of fluoride lost in this manner for a typical fluorosilicic acid feed containing 0.05% sulphate is approximately equivalent to 3% of the fluoride input. The by-product is a saleable grade of metallurgical fluorspar. The sulphate may also be removed in the form of a different insoluble sulphate in an analogous manner. Alternatively, these divalent and trivalent ionic impurities may be removed by contacting the recycle bleed stream with a suitable ion exchange resin. The resin may be regenerated with sodiun hydroxide solution or aqueous ammonia.

The ammonium fluoride solution as produced contains a very low concentration of silica in the range 0.05–0.1%. In a continuously operated process as we describe, this silica is converted in the hydrolysis liquor which is at a pH 6 to 7 into fluorosilicate ion. In this liquor, the solubility of this ion is very low (0.1%) and the silica content of the ammonium fluoride is carried forward to the solid sodium bifluoride. Within the scope of the process it is possible to allow this sodium fluorosilicate to build up in the solid sodium bifluoride to a level of up to 30%. The vapour pressure of silicon tetrafluoride over sodium fluorosilicate is sufficiently low that almost no decomposition of this salt occurs at the temperatures employed for evolution of HF from sodium bifluoride. A portion of the kilned solids is then returned to the ammoniator where the sodium fluoride dissolves and the sodium fluorosilicate is decomposed to silica, sodium fluoride and ammonium fluoride.

Fluorosilicic acid is normally available as an approximately 20% $H_2SiF_6$ aqueous solution. Upon ammoniating this solution to pH 9 as described in numerous patents and in the scientific and technological literature, and separating the silica precipitate formed, an aqueous solution of ammonium fluoride containing a small quantity of free ammonia is produced. Heating this solution leads to the formation of ammonium bifluoride and ammonia vapour. Under continuous operating conditions this conversion is effected in a reactor containing a mixture of ammonium fluoride and ammonium bifluoride. The rate of reaction is quite rapid under these conditions and increases markedly with increasing fluoride concentration. However, the reaction rate is not significantly affected by increasing bifluoride concentration, as may be seen in Table 1 below. The solutions so produced may be used after cooling for the production of crystalline ammonium bifluoride, the mother liquor being recycled. The concentrations are too great, however, for mixing directly with solid sodium fluoride to produce sodium bifluoride. If this is attempted, the solid product is principally a mixture of ammonium bifluoride and undissolved sodium fluoride.

If these liquors are diluted so that salt concentrations are reached where subsequent direct contact with a suitable quantity of sodium fluoride leads to the production of sodium bifluoride uncontaminated by co-precipitated ammonium bifluoride, the rate of ammonium bifluoride production at the boiling point is lowered significantly. However, a small increase in the pressure and temperature leads to a marked increase in reaction rate in these less concentrated solutions. At about 10-20 psig and a boiling temperature of 130°-150° C. rates approaching those achieveable in more concentrated solutions boiling at atmospheric pressure are obtained.

Further increases in pressure do not lead to any further improvement in the reaction rate as may be seen from Table 1. This is probably due to the fact that the inhibition of the release of ammonia gas becomes more important than the effect of the rise in temperature on the reaction rate. Increasing temperatures above about 145° C. lead to an increasing presence of hydrogen fluoride in the vapour phase. Below 145° C., this is negligible.

The results of a series of experiments undertaken in a pilot scale autoclave operated continuously for periods up to 48 hours at a time, with a residence time of 1-3 hours, may be used to illustrate the first part of the invention. In each experiment liquor salt concentrations were held constant, as were vapour pressure and temperature. The reaction rate is expressed as moles of bifluoride produced per liter of reactor working volume per hour. The feed was an ammonium fluoride solution obtained by ammoniation of by-product fluorosilicic acid. Constant conditions were maintained by recycling mother liquor as produced after removal of bifluoride as the sodium salt in the subsequent step. The results are shown in Table 1.

TABLE 1

| $F^-$ m.l.$^{-1}$ | $HF_2^-$ m.l.$^{-1}$ | T° C | P. psig | Rate m.l.$^{-1}$h.$^{-1}$ |
|---|---|---|---|---|
| 10.9 | 5.7 | 127 | 0 | 0.70 |
| *8.7 | 5.6 | 125 | 0 | 0.23 |
| 8.3 | 3.7 | 135 | 17 | 0.50 |
| 8.2 | 4.1 | 155 | 41 | 0.43 |
| 7.1 | 3.2 | 145 | 30 | 0.34 |
| 9.4 | 2.6 | 145 | 28 | 1.51 |
| *8.0 | 4.8 | 141 | 11 | 0.50 | m.l.$^{-1}$ moles per liter.
m.l.$^{-1}$.h$^{-1}$ moles per liter per hour.
*liquor contained 2.5% sulphate and 3.5% phosphate as $SO_4$ and $P_2O_5$ weight by weight.

Conditions were adjusted so that maximum quantities of a sodium bifluoride cake with a low ammonium content were produced while at the same time the maximum hydrolysis reaction rate was maintained. This limited the field of interest to the range of conditions shown in the Table.

The fluoride concentration is generally from 5.0 to 12.0, preferably 7.0 to 11.0 moles per liter. The bifluoride concentration is generally from 2.0 to 7.0, preferably 2.5 to 6.0 moles per liter. The boiling temperature is generally from 120° to 160°, preferably 130° to 150° C. The pressure is generally from 0 to 50, preferably 10 to 45, especially 10 to 30 psig.

The extent of the exchange reaction (2):

$$NaF + NH_4HF_2 \rightarrow NaHF_2 + NH_4F \quad (2)$$

is determined by the phase relationship of the four salts involved. The solubilities of the fluoride salts are relatively insensitive to temperature whereas the solubilities of the bifluorides increase markedly with temperature. Both sodium salts are sparingly soluble in the presence of large quantities of the much more soluble ammonium salts. In order to maximise precipitation of sodium bifluoride, a low temperature is therefore preferred. The large concentrations of fluoride ion necessary to effect a fast reaction rate in the first part of the process of the invention and the ultimate solubility of ammonium fluoride under the conditions limit the amount of sodium bifluoride it is possible to produce per unit volume of liquor.

Extensive studies on this system are summarised in Table 2. These results indicate that maximum exchange is achieved at lower temperatures, preferably in the range of from 10° to 50° C. and more preferably 15°-30° C. For illustration the system may be described as one involving contact of a liters of a liquor containing x moles per liter of ammonium bifluoride and y moles per liter of ammonium fluoride with at least b moles of sodium fluoride such that b moles of sodium bifluoride are produced and a liters of liquor containing x − b/a moles per liter of ammonium bifluoride and y + b/a moles per liter of ammonium fluoride are produced.

TABLE 2

| Ex.-pt. | T° C | Liquor Composition | | | | Moles NaHF$_2$ produced per liter | Moles NH$_4$HF$_2$ precipitated per liter |
|---|---|---|---|---|---|---|---|
| | | Before | | After | | | |
| | | HF$_2^-$ | F$^-$ | HF$_2^-$ | F$^-$ | | |
| 20 | 40 | 4.0 | 6.5 | 2.65 | 7.70 | 1.3 | 0.15 |
| 36 | 27 | 5.0 | 7.0 | 3.1 | 9.3 | 2.1 | 0 |
| 16 | 0 | 4.0 | 6.5 | 1.7 | 8.35 | 2.1 | 0.45 |
| 5 | 25 | 4.0 | 5.4 | 1.8 | 7.3 | 2.1 | 0.4 |
| 73 | 19 | 5.2 | 7.9 | 4.0 | 9.1 | 1.2 | 0 |
| 2 | 20 | 4.62 | 7.93 | 3.61 | 9.03 | 1.05 | 0 |

We have obtained precise data on ammonium fluoride/bifluoride concentrations for the direct production of a sodium bifluoride cake such that after washing and drying it is of a quality satisfactory for kilning to produce pure anhydrous hydrogen fluoride and solid sodium fluoride. We have also discovered, as shown above, a method for achieving a satisfactory rate of conversion of ammonium fluoride to ammonium bifluoride in these relatively dilute liquors. An increasing rate of hydrolysis of ammonium fluoride is obtained under conditions which are increasingly unsuited to exchange of sodium for ammonium bifluoride in the same liquor after cooling. The overall system is therefore a compromise.

The conditions under which the exchange stage is operated make allowance for the presence in these liquors of small concentrations of phosphate and sulphate impurities. The levels tolerated are large enough to permit the use of small bleed streams to effectively and continuously remove the quantities of impurities introduced. The levels tolerated are below a level at which too much ammonium ion would be associated with the impurities such that a much lower fluoride and bifluoride concentration would be necessary to avoid ammonium salt precipitation with the sodium bifluoride solid. Due to the high solubility of the phosphate and sulphate salts of both ammonium and sodium present in the liquors, there is no precipitation of these salts with the sodium bifluoride solid. The HF as produced in the kiln contains small quantities of ammonia gas, water and dust. These are removed in the purification stage. The HF gas is then condensed and redistilled to produce a grade of at least 99.9% purity.

The invention is more particularly described with reference to the accompanying drawing, which is a flow sheet of an installation for carrying out a preferred embodiment of the invention.

Fluorosilicic acid is led by a conduit 2 from storage 1 to a reactor 3 in which it is reacted with gaseous or liquid ammonia. The latter is recycled from reactor 7 via conduit 25 to a stripper 26 wherein it is purified and its associated water removed at 28. Make-up ammonia is introduced at 27. Also introduced into reactor 3 is the liquor obtained after phosphate and sulphate removal in the impurity removal section 35, which liquor is led to reactor 3 via conduits 37 and 38. A solid bleed stream from the kiln 17 is also led to reactor 3 through conduit 32 via conduit 33. The slurry produced in reactor 3 is conveyed via conduit 4 to a solid/liquid separation unit 5. The wet solid silica is brought via conduit 39 to a washing stage 40 where it is washed with water introduced through pipe 22. The drained washed cake is removed from the system via conduit 24 and the washings are incorporated via conduit 23 in the silica mother liquor which is led via conduit 6 to the reactor 7.

The reactor 7 contains a liquor boiling under atmospheric or super-atmospheric pressure. It consists of a mixture of ammonium fluoride and ammonium bifluoride and is saturated with the corresponding sodium salts. The conditions in reactor 7 are maintained in a steady state by recycle of the mother liquor from the subsequent sodium bifluoride separation stage via conduit 41 and of the washings of this cake via conduit 29. The hydrolysis of the aqueous ammonium fluoride in reactor 7 gives rise to gaseous ammonia and steam which are led via conduit 25 to the ammonia stripper 26.

The liquid product of the reaction overflows from reactor 7 via conduit 8 to a cooled stirrer reactor 9 where it is contacted with solid sodium fluoride introduced via conduit 32. The resulting slurry is led via conduit 10 to a solid/liquid separation stage 11 where the sodium bifluoride cake is removed from the mother liquor which is recycled via conduit 41. The wet solid is led via conduit 12 to a washing stage 13 where it is washed with water introduced at 30.

The wet washed solid is conveyed via conduit 14 to a dryer 15. Water vapour and traces of ammonia are removed at 31 and the dry solid is led via conduit 16 to the kiln 17 where it is heated to around 300° C. for approximately one hour. Most of the kilned solid is returned via conduit 32 to the exchange reactor 9, with a small quantity being sent via conduit 33 to reactor 3 for silica removal. The HF gas produced in the kiln is brought via conduit 18 to a purification section 19. The pure product is pumped via conduit 42 to storage 20.

A bleed stream 34 of the recycle stream 41 is passed to the impurity removal section 35. Lime and aqueous ammonia are introduced at 36 and the precipitated tri-ammonium phosphate and calcium sulphate are separated off. The purified stream is returned via conduit 37 to the reactor 7, and a side stream 38 passes to the reactor 3.

The invention is illustrated in the following Examples.

EXAMPLE 1

An aqueous solution of ammonium fluoride was obtained by the continuous ammoniation of 20% w/w fluorosilicic acid followed by filtration of the resulting slurry and contained 269 g $NH_4F$ per 1000 g of solution. The ammonium fluoride solution was fed at the rate of 193 g/h to a stirred reactor of 7.0 liters working volume operating under atmospheric pressure. Recycle liquor A, from the sodium exchange filtration step containing 202 g $NH_4HF_2$, 333 g $NH_4F$ and 11 g NaF per 1000 g of solution, was fed at the rate of 993 g/h, together with sodium exchange wash liquor, B, containing 221 g of $NH_4F$ and 130 g $NH_4HF_2$ per 1000 g of solution at the rate of 77 g/h, to the reactor vessel. Enough heat was supplied to the reactor to maintain the contents at the boiling temperature of 124° C. and to evaporate 141 g/h of $H_2O$ as well as 24 g/h of $NH_3$ produced by decomposition of $NH_4F$.

The pot liquor and recycle solution in this Example contained approximately 4.2% w/v $P_2O_5$ as well as about 3.0% w/v $SO_4$. These impurity levels resulted in an elevation of the boiling temperature over that expected in their absence.

Outflow liquor containing 265 g $NH_4HF_2$, 270 g $NH_4F$ and 10 g NaF per 1000 g of solution overflowed from the reactor at the rate of 1098 g/h and flowed into a mild steel stirred vessel of 0.4 liter capacity, the contents of which were maintained at 20° C. by external cooling. 74 g/h of recycled NaF was also directed into this sodium exchange vessel. The resultant slurry overflowed to a centrifuge where separation into a clear filtrate and a wet cake was accomplished. The filtrate, A, with a concentration as stated above was recycled to the reactor.

The wet cake was washed with water and the resultant wash liquor, B, the concentration of which is given above was also fed into the reactor vessel.

A wet solid containing 561 g $NaHF_2$, 97 g NaF, and 323 g $H_2O$ per 1000 g of cake was produced at the rate of 155 g/h. After drying at 100°–110° C., the cake was calcined at 320° C. to produce 28 g/h HF and 74 g/h NaF for recycle to the sodium exchange vessel.

EXAMPLE 2

An aqueous solution of ammonium fluoride was obtained by the continuous ammoniation of 20% w/w fluorosilicic acid and filtration of the resulting slurry and contained 269 g $NH_4F$ per 1000 g of solution. The ammonium fluoride solution was fed at the rate of 193 g per hour to a mild steel stirred reactor of 2.0 liter working volume operating under atmospheric pressure. Recycle liquor A, from the sodium exchange filtration step containing 153 g $NH_4HF_2$, 247 g $NH_4F$ and 7 g NaF per 1000 g of solution, was fed at the rate of 2350 g/hr, together with sodium exchange wash liquor, B, containing 143 g $NH_4HF_2$ and 232 g $NH_4F$ per 1000 g of solution at the rate of 70 g/hr, to the reactor vessel. Enough heat was supplied to the reactor to maintain the contents at the boiling temperature of 127° C. and to evaporate 767 g/h of $H_2O$ as well as 24 g/h of $NH_3$ produced by decomposition of $NH_4F$.

Outflow liquor containing 247 g $NH_4HF_2$, 298 g $NH_4F$ and 9 g NaF per 1000 g of solution overflowed from the reactor at the rate of 1823 g/h and flowed into a mild steel stirred vessel of 0.8 liter capacity, the contents of which were maintained at 20° C. by external cooling. 632 g/h of water together with 74 g/h of recycled NaF were also directed into this sodium exchange vessel. The resultant slurry overflowed to a centrifuge where separation into a clear filtrate and a wet cake was accomplished. The filtrate A, with a concentration as stated above, was recycled to the reactor. The wet cake was washed with water and the resultant wash liquor B, the concentration of which is given above was also fed into the reactor vessel.

A wet solid containing 558 g NaHF$_2$, 96 g NaF, and 327 g H$_2$O per 1000 g of cake was produced at the rate of 156 g/h. After drying at 100°-110° C. the cake was calcined at 320° C. to produce 28 g/h HF and 74 g/h NaF for recycle to the sodium exchange vessel.

EXAMPLE 3

An aqueous solution of ammonium fluoride was obtained from the continuous ammoniation of 20% w/w fluorosilicic acid and filtration of the resulting slurry and contained 269 g ammonium fluoride per 1000 g solution. The ammonium fluoride solution was fed at the rate of 193 g/h to a mild steel stirred pressure vessel of 2.8 liter working volume operating under an autogenous pressure of 13 psig. Recycle liquor, A, from the sodium exchange filtration step containing 174 g ammonium bifluoride, 301 g NH$_4$F and 14 g NaF per 1000 g of solution was fed at the rate of 1198 g/h, together with sodium bifluoride wash liquor, B, containing 130 g NH$_4$HF$_2$ and 217 g NH$_4$F per 1000 g of solution at the rate of 84 g/h, to the reactor vessel. Enough heat was supplied to the pressure vessel to maintain the contents at the boiling temperature of 140° C. and to evaporate 150 g/h of water and also 24 g/h of NH$_3$ produced by decomposition of NH$_4$F.

Outflow liquor containing 230 g NH$_4$HF$_2$, 251 g NH$_4$F and 13 g NaF per 1000 g of solution was removed from the pressure vessel at the rate of 1301 g/h and conducted to a mild steel reactor of 0.50 liter capacity, the contents of which were maintained at 20° C. by external cooling. 74 g/h of recycled sodium fluoride were also directed to this vessel. The resultant slurry overflowed to a centrifuge where separation into a clear filtrate and a wet cake was accomplished. The filtrate, A, with a concentration as stated above, was recycled to the pressure reactor. The wet cake was washed with water and the resultant wash liquor, B, with a concentration as stated above was also fed back to the pressure vessel. A wet solid containing 576 NaHF$_2$, 99 g NaF and 305 g H$_2$O per 1000 g of cake was produced at the rate of 151 g/h. After drying at 100°-110° C., the cake was calcined to produce 28 g/h of HF and 74 g/h NaF for recycle to the sodium exchange step.

EXAMPLE 4

50 ml of water were added to 100 ml of a solution containing 219 g NH$_4$HF$_2$, 225 g NH$_4$F and 59.5 g P$_2$O$_5$ per 1000 g. Ammonia gas was sparged into this diluted liquor until the resulting suspension had a free ammonia content of 8.2% by weight. The heat evolved was removed by external cooling such that a temperature of 22° C. was reached at which the slurry was filtered. A wet solid was obtained containing 36.8% P$_2$O$_5$, 29.2% NH$_3$ and 4.7% F by weight. The filtrate of volume 145 mls. and density 1.05 g/ml contained 372 g NH$_4$F and 2.1 g P$_2$O$_5$ per 1000 g solution.

We claim:

1. A process for preparing sodium bifluoride, which comprises feeding aqueous ammonium fluoride to a continuously operated reactor containing a mixture of ammonium fluoride and ammonium bifluoride in aqueous solution, the mixture containing 7.0 to 11.0 moles per liter of fluoride ions and 2.5 to 6.0 moles per liter of bifluoride ions, and boiling at a temperature of from 130° to 150° C. under a pressure of from 10 to 30 psig, whereby there is a net production of ammonium bifluoride from ammonium fluoride with the release of ammonia; withdrawing aqueous reaction liquor containing ammonium fluoride and ammonium bifluoride from said reactor; cooling the withdrawn reaction liquor to a temperature of from 10° to 50° C.; contacting the cooled reaction liquor with sodium fluoride whereby the sodium fluoride reacts with the ammonium bifluoride to produce sodium bifluoride; and recovering said sodium bifluoride.

2. A process for the manufacture of hydrogen fluoride from fluorosilicic acid, which comprises reacting the fluorosilicic acid with ammonia to produce aqueous ammonium fluoride and solid silica; feeding the aqueous ammonium fluoride to a continuously operated reactor containing a mixture of ammonium fluoride and ammonium bifluoride in aqueous solution, the mixture containing 7.0 to 11.0 moles per liter of fluoride ions and 2.5 to 6.0 moles per liter of bifluoride ions, and boiling at a temperature of from 130° to 150° C. under a pressure of from 10 to 30 psig, whereby there is a net production of ammonium bifluoride from ammonium fluoride with the release of ammonia; withdrawing aqueous reaction liquor containing ammonium fluoride and ammonium bifluoride from said reactor; cooling the withdrawn reaction liquor to a temperature of from 10° to 50° C.; contacting the cooled reaction liquor with sodium fluoride whereby the said fluoride reacts with the ammonium bifluoride to produce sodium bifluoride; recovering said sodium bifluoride; and decomposing said sodium bifluoride by heating to form hydrogen fluoride gas and solid sodium fluoride.

3. A process as claimed in claim 2, wherein all stages are operated continuously, the sodium fluoride produced by heating the sodium bifluoride is recycled to the sodium bifluoride production stage, the mother liquor obtained at the sodium bifluoride production stage is recycled to the continuously operated reactor, and the ammonia released is recycled after separation from admixed steam to the ammoniation of fluorosilicic acid stage.

4. A process as claimed in claim 2, wherein sodium fluoride and sodium bifluoride are present in the mixture in the continuously operated reactor to minimise the corrosion of steel by the mixture.

5. A process as claimed in claim 2, wherein sulphate impurity in the fluorosilicic acid is removed by precipitation from a bleed stream of the continuously operated reactor mixture in the form of an insoluble sulphate by contacting this stream with an insoluble-sulphate-forming agent.

6. A process as claimed in claim 2, comprising in addition washing and drying the sodium bifluoride to form a sodium bifluoride solid which is substantially free of ammonia and water before heating the sodium bifluoride to decomposition; and wherein the hydrogen fluoride gas formed by decomposing the solid sodium bifluoride is of at least 99.9% purity.

7. A process as claimed in claim 2, comprising in addition removing a portion of the aqueous solution from the continuously operated reactor and ammoniating the withdrawn solution so as to precipitate phosphate impurity as a triammonium phosphate salt in a readily separable form, whereby the phosphate impurity brought into the reactor as part of the fluorosilicic acid is removed from the process after it has reached a predetermined level in the mixture.

* * * * *